United States Patent [19]

Emoto

[11] Patent Number: 5,197,830
[45] Date of Patent: Mar. 30, 1993

[54] THROW AWAY CUTTER

[75] Inventor: Shigenori Emoto, Itami, Japan

[73] Assignee: Sumitomo Electric Industries, Ltd., Osaka, Japan

[21] Appl. No.: 765,033

[22] Filed: Sep. 24, 1991

[30] Foreign Application Priority Data

Oct. 4, 1990 [JP] Japan .................................. 2-267785

[51] Int. Cl.⁵ .............................................. B23C 5/20
[52] U.S. Cl. ......................................... 407/42; 407/61
[58] Field of Search ...................... 407/34, 42, 53, 56, 407/61, 100, 115

[56] References Cited
FOREIGN PATENT DOCUMENTS
0312970 4/1989 European Pat. Off. .............. 407/34

Primary Examiner—Steven C. Bishop
Attorney, Agent, or Firm—Wenderoth, Lind & Ponack

[57] ABSTRACT

A disposable cutter has a cutter body formed with chip pockets and a plurality of disposable inserts having cutting edges. Each pocket is formed at least at the front or inner side of the body with a spherical blind groove portion. The center of radius of curvature of the spherical blind groove portion is located on an imaginary line drawn from the front end of each cutting edge toward the pocket at a substantially right angle with respect to each cutting edge.

4 Claims, 3 Drawing Sheets

THROW AWAY CUTTER

BACKGROUND OF THE INVENTION

This invention relates to a throw away cutter in which the runout of cutter edges is minimized and the number of cutter edges can be increased by improving the shape of chip pockets formed in the cutter.

In recent years, throw away cutters having a high-rake structure for higher cutting ability are increasing in number partly because of an increasing difficulty in cutting materials to be cut and partly because of the increasing requirement for accuracy.

But with many of these cutters, the chip pockets formed in the body for the respective cutter edges are still the same chip pockets that have been used conventionally. Namely, as shown in FIG. 7, they are in the shape of through grooves having a cylindrical wall. In the figure, 1 is a cutter body, 2 is a throw away insert having a cutting edge 2a, and 3' is a chip pocket.

As shown in FIG. 8, such conventional chip pockets 3' are formed by thrusting a rotating spherical machining tool A such as a ball end mill through the cutter body in the direction of an arrow in FIG. 7. The surface of the pocket thus formed has a uniform radius of curvature and extends obliquely rearwardly from the front of the body toward the outer periphery along the cutting edge.

Since chips tend to flow along the rake face, if the cutting edges are of a high rake type, there is no need to form large pockets at the front or inner side. Rather, in order to achieve high performance, it will be more important to increase the rigidity of the body by reducing the pocket size at the front or inner side.

But since conventional chip pockets are in the form of through grooves having a uniform radius of curvature, the higher the rake angle of the cutter edges, the more the cutter body has its front side cut off more than necessary. This results in a back metal portion 1a for supporting the inserts which is too thin to assure the rigidity of the body. This will in turn worsen the runout of the cutter. If the thickness of the back metal portion 1a were increased, the total number of cutting inserts would have to be reduced. This will have a bad influence on the working efficiency and the accuracy of working surface.

SUMMARY OF THE INVENTION

An object of this invention is to provide a throw away cutter which has chip pockets having a shape effective in solving these problems.

In accordance with the present invention, there is provided a throw away cutter having a cutter body formed with chip pockets and a plurality of throw away inserts having cutting edges and mounted with a positive axial rake angle, each chip pocket being formed at least at the front or inner side of the cutter body with a spherical blind groove portion, the center of the radius of curvature of the spherical blind groove portion being located on an imaginary line drawn from the front end of each cutting edge toward the pocket at a substantially right angle with respect to the cutting edge.

By forming the front or inner part of each chip pocket with a spherical blind groove portion, the front part of the edge of the pocket is located nearer to the corresponding cutting edge. This serves to increase the thickness of the above-mentioned back metal portion. Thus, even if the cutting edges are of a high-rake-angle type, the rigidity of the body increases. This will decrease the runout of cutting edges. Also, if it is not necessary to increase the thickness of the back metal portion, the total number of the cutting inserts can be increased by shortening the pitch between the adjacent cutting edges.

BRIEF DESCRIPTION OF THE DRAWINGS

Other features and objects of the present invention will become apparent from the following description taken with reference to the accompanying drawings, in which.

DETAILED DESCRIPTION OF THE INVENTION

Figure 1:
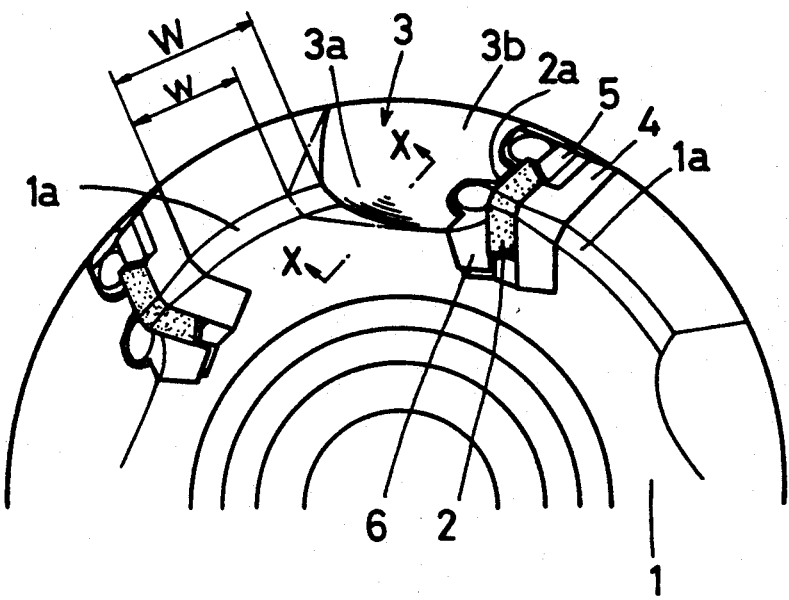
FIGS. 1 and 2 are partial front views of cutters according to this invention having different numbers of cutting inserts.

In the drawings, numeral 1 is a substantially cylindrical cutter body, 2 is a disposable insert, 3 is a chip pocket, 4 is a sheet attached to the front side of a back metal portion 1a, 5 is a locator held against the sheet 4, and 6 is a wedge-like clamp block fitted between the insert and the cutter body by a known screw (not shown) and supported by the locator and the body.

Each chip pocket 3 comprises a spherical blind groove portion 3a at the front of the body or at a side near its axis i.e. a radially inner portion 3a bounded by a back wall which is substantially spherical concave shaped and faces substantially radially outwardly with respect to the rotational direction of the cutter and a through groove portion 3b having a constant radius of curvature R and provided at the rear part so as to extend obliquely outwardly from the groove portion 3a to the outer periphery of the body substantially in parallel with the cutting edge 2a i.e. the through groove portion 3b opens substantially radially outwardly through an outer circumferential sidewall of the substantially cylindrical cutter body. In forming the pockets 3, a spherical machining tool A having a radius of curvature R as shown in FIG. 4 is used to cut into the body 1 from its outer periphery (from the rear of the groove) and is moved so that the center O of radius R of the semi-circular cutting edge will pass the line C in FIG. 3. When the center O of R reaches an imaginary line drawn from the front end of the cutting edge 2a at a right angle therewith (position shown in FIG. 3), the tool is stopped.

Figure 2:
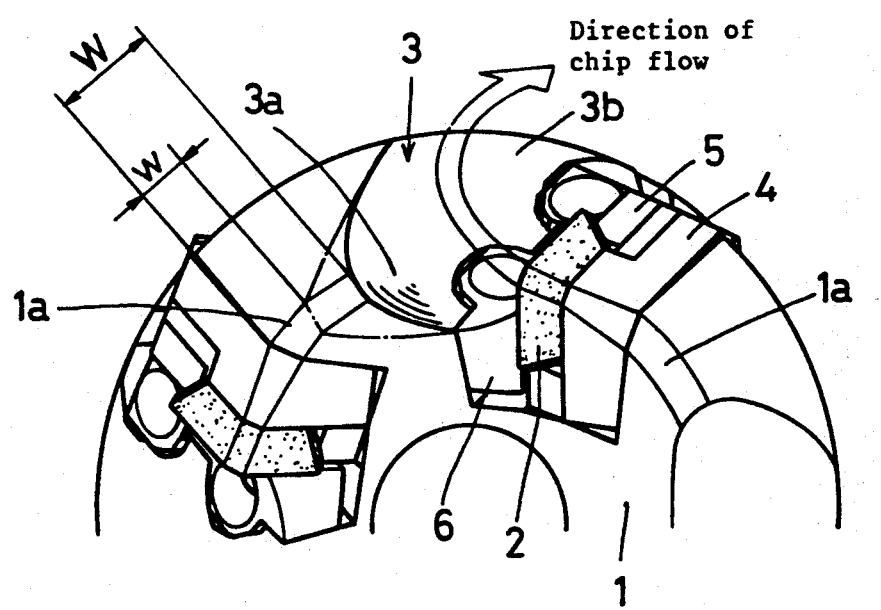
Figure 6:
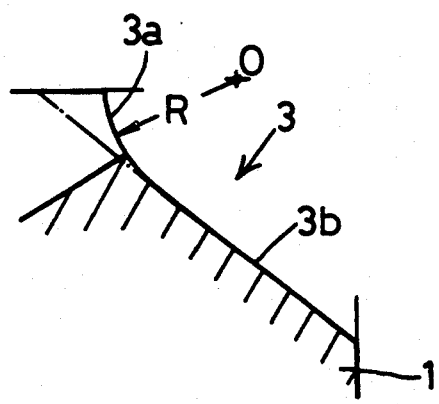
FIG. 6 is a sectional view taken along line X—X of FIG. 1.
Figure 7:
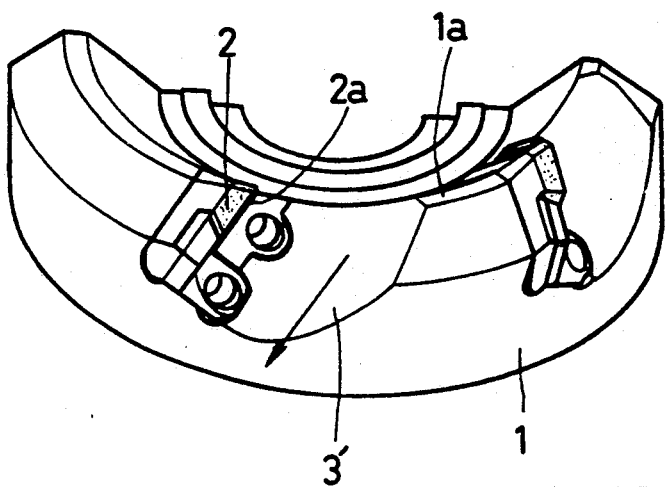
FIGS. 7 and 8 are perspective views, similar to FIG. 3 and 4, respectively, but depicting.
Figure 8:
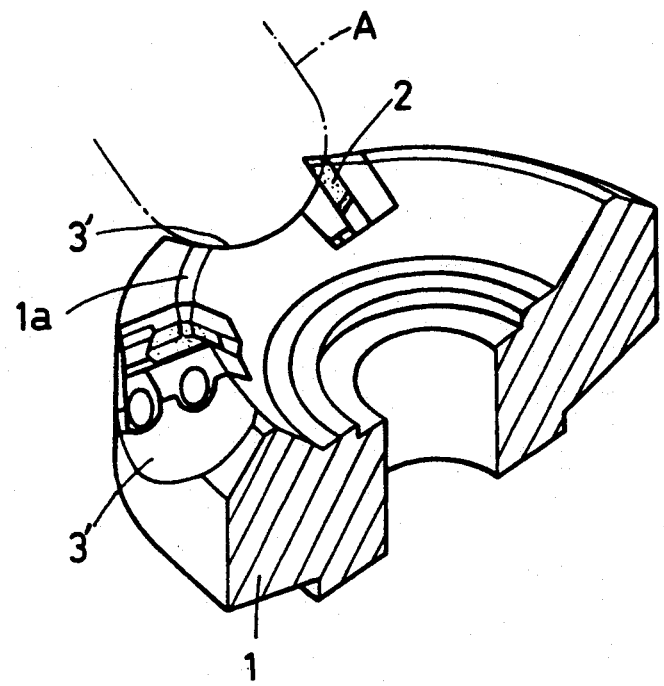

As shown in FIG. 6, the spherical blind groove portion 3a has a wall surface rising toward the front or inner side of the cutter body 1 in contrast to a conventional pocket which extends in a straight line at this portion as shown by chain line in FIG. 6. This means that while a conventional pocket has a contour as shown by chain lines in FIGS. 1 and 2 (dotted line in FIG. 4), the pocket of this embodiment has a contour as shown by solid lines. As a result, the width of the back metal portion 1a has increased from w to W. This increases the rigidity of the cutter body. The larger the axial rake angle of the cutting edge 2a, the greater the difference (W−w). Also, the difference increases progressively with the diameter of the cutter. Thus, the number of cutting edges can be increased by shortening the pitch between the adjacent cutting edges.

The pockets 3 are shown to extend substantially parallel to the cutting edges 2a. But they may be more or less inclined with respect to them.

Figure 3:
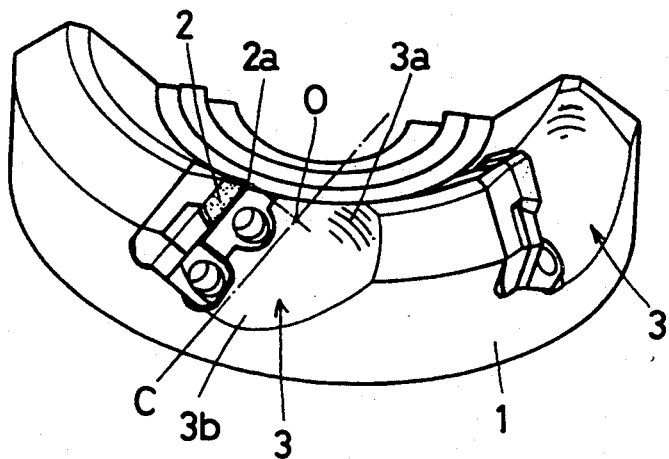
FIG. 3 is a perspective view of the cutter of FIG. 1 from the outer peripheral side thereof as viewed.
Figure 4:
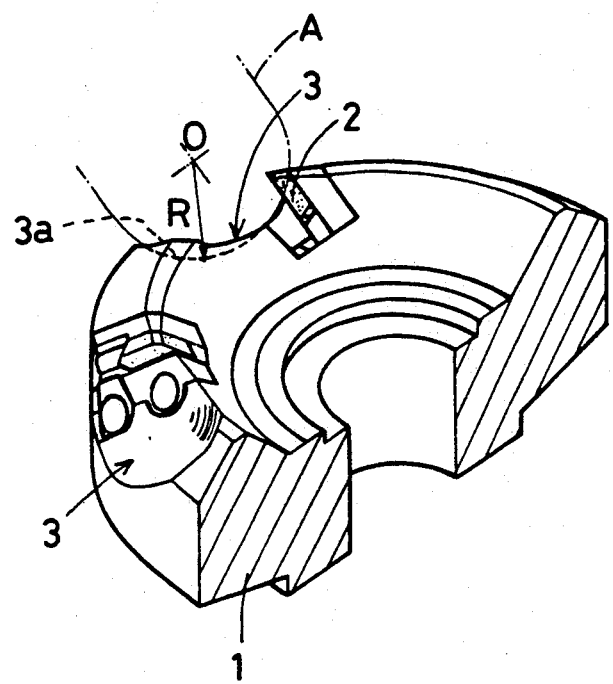
FIG. 4 is a perspective view of the cutter of FIG. 1 as viewed from the inner peripheral side thereof.
Figure 5:
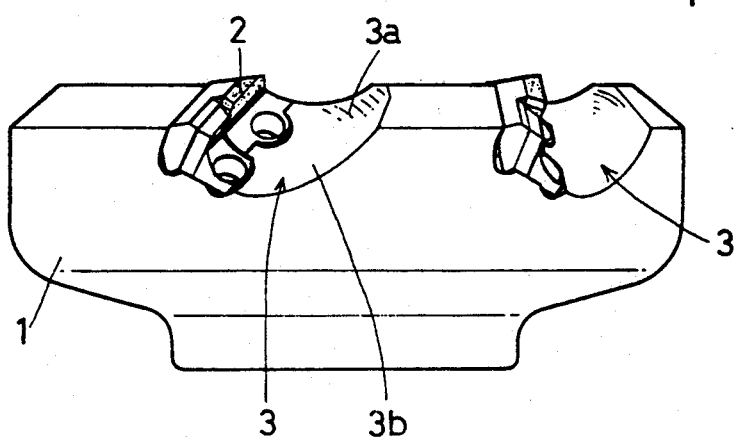
FIG. 5 is side view of the cutter of FIG. 1.

The center O of radius R of each spherical blind groove 3 may be approximately in the position of FIG. 3. Namely, the object of the invention can be attained even if it is slightly displaced from the position of FIG. 3 toward or away from the axis of the cutter.

The pocket 3 may be formed in any other way. For example, the tool A shown in FIG. 4 may be cut into the body in the direction of depth of pocket at the point O of FIG. 3 and then moved axially of the groove until it cuts through the body to its outer periphery.

Depending upon the shape of the cutter, each pocket 3 may have another spherical blind groove portion at its rear. In forming such a pocket, a spherical cutting tool may be cut into the body to a certain depth, moved laterally to the other end of the pocket and then pulled out in the axial direction. By providing such an additional spherical blind groove portion at the rear of each pocket, the rigidity of the cutter body increases at the rear part thereof. This makes it possible to reduce the thickness of the cutter in the axial direction. But such rear spherical blind groove portions should not be provided if this has any bad influence on the discharge chips.

According to this invention, each chip pocket is provided at least at its front or inner side with a spherical blind groove portion. With this arrangement, the pocket size can be reduced at the front or inner side of the cutter while maintaining a sufficient pocket capacity for discharging chips. Thus, the body has an increased rigidity and runout of the cutting edges is greatly reduced compared with conventional cutters.

In order to confirm these facts, we compared the runout of the cutting edges before improvement with the runout after improvement by use of a cutter having a diameter of 160 mm, eight cutting edges, and an approach angle of 45 degrees, an axial rake angle of +27 degrees, and a radial rake angle of −7 degrees. Before improvement is made, the runout of the eight cutting edges mounted at random and adjusted was 0.04–0.05 mm. After improvement, the runout was within 0.01–0.015 mm with a simple adjustment.

Since the pockets are compact in size, the number of cutting inserts can be increased. Thus, the performance of the cutter and the machining efficiency therefor, will improve.

What is claimed is:

1. A cutter comprising:
   a substantially cylindrical cutter body adapted to be rotated about its central axis in a rotational direction;
   a plurality of disposable cutting inserts mounted to an upper end face of said substantially cylindrical cutter body, said cutting inserts having rake faces and having cutting edges which extend obliquely relative to radial lines radiating from said central axis of said cutter body and intersecting said cutting edges, respectively; and
   wherein chip pockets are formed in said upper end face of said cutter body adjacent said rake faces of said cutting inserts, respectively, each of said chip pockets opening substantially radially outwardly through an outer circumferential sidewall of said substantially cylindrical cutter body and having a radially inner portion bounded by a back wall which is substantially spherically concave shaped and faces substantially radially outwardly and rearwardly with respect to the rotational direction of said cutter body.

2. A cutter as recited in claim 1, wherein
   each of said chip pockets is substantially in the form of a groove which extends in a direction substantially parallel with said cutting edge of said cutting insert and which is closed at its radially inner end by said back wall and opens at its radially outer end through said outer circumferential sidewall of said substantially cylindrical cutter body.

3. A cutter as recited in claim 1, wherein
   for each of said chip pockets, a center of curvature of said spherically concave back wall is located on a line extending perpendicular from said cutting edge of said cutting insert.

4. A cutter as recited in claim 1, wherein
   said rake faces of said cutting inserts have positive axial rake angles, respectively.

* * * * *